B. EDWARDS.
Corn Sheller.
No. 5,578.  Patented May 16, 1848.
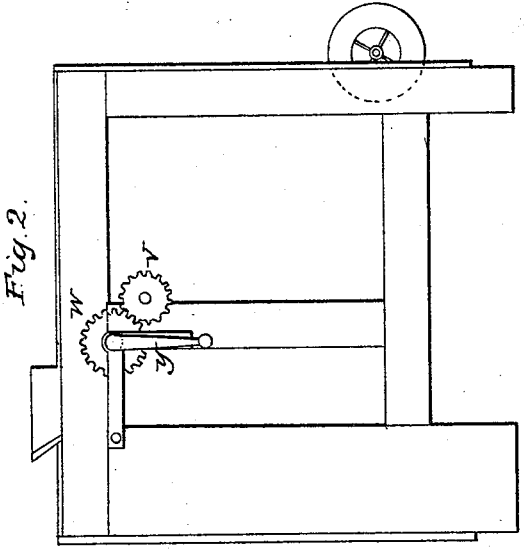
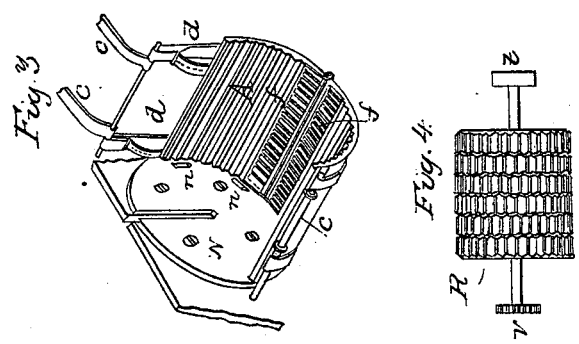
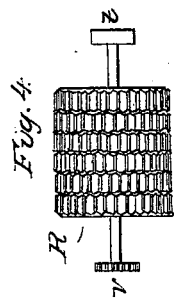
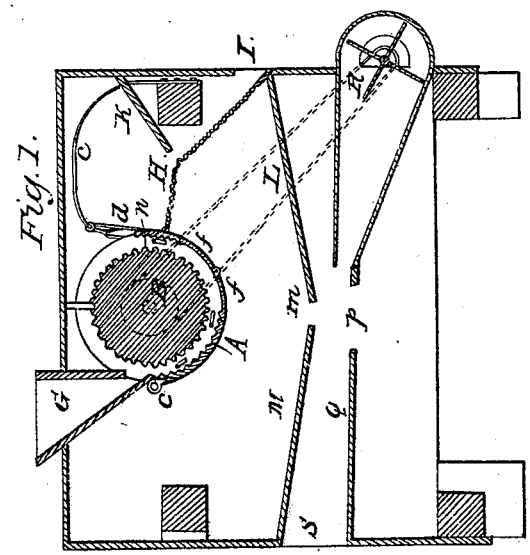

UNITED STATES PATENT OFFICE.

BENJN. EDWARDS, OF LACYVILLE, PENNSYLVANIA.

CORN-SHELLER.

Specification of Letters Patent No. 5,578, dated May 16, 1848.

*To all whom it may concern:*

Be it known that I, BENJAMIN EDWARDS, of Lacyville, in the county of Wyoming and State of Pennsylvania, have invented a new and Improved Machine for Shelling Corn from the Cobs and Separating the Same from Dust and Trash; and I do hereby declare the following to be a full, clear, and exact description of the construction and operation thereof, reference being had to the accompanying drawings, making a part of this specification, in which—

Figure 1, is a longitudinal vertical section. Fig. 2, a side elevation, and Figs. 3 and 4, portions of the same detached.

Similar letters refer to corresponding parts in all the figures.

The nature of my invention consists essentially in the peculiar formation of the fluted concave A, and the combination of the same with a toothed cylinder B; viz:—constructing the concave in two parts united by a hinge joint;—securing the upper edge of the front side of the concave to a rod $c$, and suspending the concave by leather or other suitable flexible bands $d$, $d$, passing under the same, one end of each being made fast to the rod $c$, aforesaid, and their opposite ends to springs $e$, $e$; thus giving a flexible bearing of the concave upon the cylinder; and finally in forming screens $f$, $f$, in the lower part of the concave to allow the corn to pass through the same, while the cobs are discharged at the rear side of the concave; thus preventing the machine from clogging, and reducing the power required to drive the same.

G, is the hopper in to which the ears of corn are placed to be shelled.

H, is a screen at the rear of the concave, which receives the cobs as they are discharged from the same, and conducts them through the aperture I, at the rear end of the machine. The front end of the screen H, is hinged to the straps $d$, $d$, from whicn it receives a vibratory movement, caused by the jarring motion imparted to the concave in shelling the corn.

K, is a tail board above the screen H, which conducts the corn and cobs as they are thrown on to the same from the concave, forward upon the front end of the screen; the corn passing through the screen H, falls on to the inclined board L, which conducts the same to the discharging aperture $m$. It will be perceived that the front portion of the screen H, is nearly horizontal, and the remainder of the same considerably inclined; the object of this formation is to prevent a portion of the corn from being discharged from the screen — through the aperture I, with the cobs; which is found to be the case when the screen is straight and inclined sufficiently to carry off the cobs. But by making the screen of the form represented, the corn all passes through the horizontal portion of the same, while the cobs are discharged from the inclined portion.

Cast iron disks N, are secured to the sides of the machine, opposite the ends of the concave, having lugs $n$, $n$, cast upon their face for the purpose of preventing the surface of the concave from coming in contact with the face of the cylinder. The pressure between the cylinder and concave is greatest, it will readily be perceived, at that point where a straight line drawn from the ends of the suspending springs $e$, $e$, through the center of the cylinder would cut the concave; and gradually diminishes from that point to the rear upper edge of the concave. This arrangement is very important, causing the saving of power, and insuring the perfect performance of the machine.

The pressure between the concave and cylinder is greatest at that point where it should be, viz:—just below where the corn enters the concave. Most of the corn will be separated from the cobs before they reach the screen, $f$, and any remaining portion will be removed in passing up the rear side of the concave; consequently, there should be less space between the concave and cylinder on the rear side, and less pressure between them than at the front side; which result is perfectly accomplished by making the concave in two parts, united by hinges, with the front part thereof hinged to the permanent bearing rod $c$, and the remainder of the concave suspended and combined with the cylinder by means of flexible straps and springs as described. As the ears of corn enter the concave, the pressure exerted on the front side of the concave in shelling the same, causes the rear side of the concave more closely to adhere to the cylinder, and consequently to perfectly separate any remaining kernels that may remain upon the cobs as they are discharged. The corn falls from the screens $f$, $f$, in the concave, through the aperture $m$, between the inclined boards L and M, and through the aperture P, between the horizontal board Q, and the mouth of the fanner R, to the receiving receptacle under the machine. The dust and trash are separated from the corn by the fanner and discharged through the throat S, at the front of the machine.

$v$, is a pinion on the axle of the toothed cylinder B.

$w$, is a driving cog wheel working into the pinion $v$, having its bearings secured to the side of the machine.

$y$, is a crank on the axle of the cog wheel $w$, for driving the machine by, when driven by hand. The cylinder B, is covered with a series of teeth, no two of which are in a line with each other; or it may be fluted if preferred.

The machine may be driven by steam, horse, or other power, or by hand.

The distance between the concave and cylinder is adjusted and regulated by lengthening or shortening the suspending straps $d, d$, which is effected by means of buckles or in any other convenient manner. The fanner R, is driven by band from the pulley $t$, on the axle of the cylinder B. The fanner may be—if preferred—placed in the front end of the machine, and the trash discharged at the rear; I shall generally arrange the fanner in this manner.

Having thus fully described my improved machine for shelling corn from the cobs, and for separating the same from dust and trash, what I claim therein as new and desire to secure by Letters Patent, is—

1. The giving the concave a flexible and self adjusting bearing on the cylinder, by the following combination and arrangement, to wit: constructing the concave of two jointed parts connected to the permanent rod $c$, at the front, and suspended by the flexible bands $d, d$, passing under the concave with their front ends made fast to rod $c$, and their rear ends to the springs $e, e$, substantially as herein set forth.

2. I also claim the combining a screen H, of the form herein described, with the bands $d, d$, and the tail board K, substantially in the manner and for the purpose herein set forth.

BENJN. EDWARDS.

Witnesses:
Z. C. ROBBINS,
GUY C. HUMPHRIES.